(12) United States Patent
Dang et al.

(10) Patent No.: US 12,027,922 B2
(45) Date of Patent: Jul. 2, 2024

(54) ROTOR ASSEMBLY AND METHOD FOR MOTOR END WINDING COOLING AND BEARING LUBRICATION

(71) Applicant: Rivian IP Holdings, LLC, Plymouth, MI (US)

(72) Inventors: Dang Dinh Dang, Garden Grove, CA (US); Lon Cooper, Redondo Beach, CA (US); Larry Xiong, Redondo Beach, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 144 days.

(21) Appl. No.: 17/235,484

(22) Filed: Apr. 20, 2021

(65) Prior Publication Data

US 2022/0337113 A1 Oct. 20, 2022

(51) Int. Cl.
*H02K 1/32* (2006.01)
*H02K 1/27* (2022.01)
*H02K 1/276* (2022.01)
*H02K 5/173* (2006.01)
*H02K 9/19* (2006.01)
*H02K 9/26* (2006.01)
*H02K 21/14* (2006.01)

(52) U.S. Cl.
CPC ............... *H02K 1/32* (2013.01); *H02K 1/276* (2013.01); *H02K 5/1732* (2013.01); *H02K 9/19* (2013.01); *H02K 9/26* (2013.01); *H02K 21/14* (2013.01)

(58) Field of Classification Search
CPC .......... H02K 5/1732; H02K 9/19; H02K 1/32; H02K 21/14; H02K 1/276; H02K 9/26

USPC .......................................................... 310/54
See application file for complete search history.

(56) References Cited

U.S. PATENT DOCUMENTS

| | | | | |
|---|---|---|---|---|
| 7,994,668 B2* | 8/2011 | Gerstler | ................ | H02K 9/197 310/216.057 |
| 8,421,297 B2* | 4/2013 | Stout | ...................... | H02K 1/165 310/214 |
| 8,803,380 B2* | 8/2014 | Chamberlin | ........... | H02K 5/203 310/64 |
| 8,916,997 B2* | 12/2014 | Kirkley, Jr. | ............ | H02K 5/203 310/90 |
| 8,970,074 B2* | 3/2015 | Wagner | .................. | H02K 7/003 310/59 |
| 8,970,075 B2* | 3/2015 | Rippel | ..................... | H02K 1/32 310/60 A |
| 9,762,106 B2* | 9/2017 | Gauthier | .................. | H02K 9/19 |
| 9,917,486 B2* | 3/2018 | Kirkley, Jr. | ............ | H02K 5/203 |
| 10,038,355 B2* | 7/2018 | Brauer | .................... | H02K 5/203 |
| 10,128,705 B2* | 11/2018 | Yang | ........................ | H02K 1/16 |
| 10,587,162 B2* | 3/2020 | Yang | ....................... | H02K 11/40 |
| 2003/0030333 A1* | 2/2003 | Johnsen | .................... | H02K 1/32 310/54 |

(Continued)

*Primary Examiner* — Alex W Mok
(74) *Attorney, Agent, or Firm* — BAKERHOSTETLER

(57) ABSTRACT

A rotor/stator assembly for a motor, including: a rotor shaft including an internal channel; a rotor core disposed adjacent to the rotor shaft; and end windings disposed adjacent to an end of the rotor shaft and an end of the rotor core; wherein the rotor shaft includes a passage passing through a wall of the rotor shaft adjacent to the end thereof, thereby forming a path by which a cooling fluid passes from the internal channel of the rotor shaft to the end of the rotor core and the end windings when the rotor shaft and rotor core are rotated/rotating.

20 Claims, 12 Drawing Sheets

(56) References Cited

U.S. PATENT DOCUMENTS

| | | | |
|---|---|---|---|
| 2010/0019601 A1* | 1/2010 | Saban | H02K 1/278 |
| | | | 310/156.28 |
| 2013/0095232 A1* | 4/2013 | Kaiser | H02K 15/12 |
| | | | 427/104 |
| 2015/0285263 A1* | 10/2015 | Bucking | F02C 6/12 |
| | | | 415/116 |
| 2018/0278127 A1* | 9/2018 | Huang | H02K 9/197 |
| 2019/0207477 A1* | 7/2019 | Garriga | F16C 37/007 |

* cited by examiner

ROTOR ASSEMBLY AND METHOD FOR MOTOR END WINDING COOLING AND BEARING LUBRICATION

INTRODUCTION

The present disclosure relates generally to the automotive, manufacturing, and industrial equipment fields. More particularly, the present disclosure relates to a rotor assembly and method for motor end winding cooling and bearing lubrication.

Managing temperatures of an electric machine (EM) is critical to motor performance and reliability. When in operation, heat is generated at the end (crown and weld) windings of the electric stator motor, for example. With inadequate cooling, temperatures rise beyond allowable limits, affecting various components throughout the EM. Prolonged and increasingly high temperatures reduce the life of the various components, reducing performance when the rotor effectively becomes a cooling sink, leading to torque output reduction, for example. To ensure that motor performance is not thermally limited, it is important to direct cooling oil to all critical locations to ensure that there are no hot spots. In addition to cooling the EM end windings, it is also important to direct lubricating oil to all rotor shaft bearings, for example.

The present background is provided by way of illustrative environmental context only. It will be readily apparent to those of ordinary skill in the art that the principles of the present disclosure may be implemented in other environmental contexts equally.

SUMMARY

The present disclosure provides a rotor assembly and method for cooling EM end windings and lubricating rotor shaft bearings that makes use of centrifugal force generated by the rotating rotor shaft and rotor core, while minimizing component complexity and packaging volume. Conditioned fluid, such as cool oil, is pumped from a heat exchanger and enters an internal channel formed along a rotor axis of a rotor shaft via a cooling fluid inlet tube, while the rotor shaft and rotor core are rotating. The rotating rotor shaft and rotor core generate centrifugal force that pushes the cool oil through radial passages formed through the rotor shaft wall near the ends of the rotor shaft, on either side of the rotor core in the area of the crown end windings and the weld end windings, adjacent to the outlet end ring and the annulus end ring. Heat generated by the end windings due to ohmic losses is absorbed by the cool oil as the oil is directed and sprayed onto the full internal circumference of the end windings, and the oil heats up. Hot oil drains back to an oil sump of the assembly to be recirculated back to the heat exchanger to be cooled again, as well as a pump and optional filter. By utilizing passages perpendicular to the rotor axis (e.g., a height axis of the rotor shaft that passes through the center point of the rotor), the end windings are primarily cooled by the cool oil. By utilizing angled passages, the bearings in the vicinity are also lubricated, in addition to the end windings being cooled by the cool oil. The passages at either end of the rotor shaft can have different cross-sectional diameters, such that a desired oil flow balance is maintained between the two ends of the rotor shaft and rotor core and the end windings and bearings.

In one illustrative embodiment, the present disclosure provides a rotor/stator assembly for a motor, including: a cylindrical rotor shaft including, encompassing, forming, and/or defining an internal channel disposed along a rotor axis; a cylindrical rotor core disposed concentrically about the cylindrical rotor shaft; a plurality of crown end windings disposed concentrically about a first end of the rotor shaft and a first end of the rotor core; and a plurality of weld end windings disposed concentrically about a second end of the rotor shaft and a second end of the rotor core; wherein the rotor shaft defines a first passage passing through a wall of the rotor shaft at the first end thereof, thereby forming a first path/passage by which a cooling fluid passes from the internal channel of the rotor shaft to the first end of the rotor core when the rotor shaft and rotor core are rotated/rotating; and wherein the rotor shaft defines a second passage passing through the wall of the rotor shaft at the second end thereof, thereby forming a second path/passage by which the cooling fluid passes from the internal channel of the rotor shaft to the second end of the rotor core when the rotor shaft and rotor core are rotated/rotating. One or more of the first passage and the second passage are aligned perpendicular to the rotor axis such that the cooling fluid passes from the internal channel of the rotor shaft to one or more of the crown end windings and the weld end windings when the rotor shaft and rotor core are rotated/rotating. Alternatively or in combination, one or more of the first passage and the second passage are aligned non-perpendicular to the rotor axis such that the cooling fluid passes from the internal channel of the rotor shaft to one or more of the crown end windings and the weld end windings when the rotor shaft and rotor core are rotated/rotating, as well as one or more of a first bearing disposed adjacent to the first end of the rotor core and a second bearing disposed adjacent to the second end of the rotor core for cooling and lubrication. The rotor shaft defines a plurality of radially-arranged first passages passing through the wall of the rotor shaft at the first end thereof. The rotor shaft also defines a plurality of radially-arranged second passages passing through the wall of the rotor shaft at the second end thereof. One or more of the first passages has/have a relatively smaller cross-sectional diameter than a relatively larger cross-sectional diameter of one or more of the second passages, thereby balancing cooling fluid flow through the first passage(s) and the second passage(s).

In another illustrative embodiment, the present disclosure provides a motor assembly, including: a rotor/stator assembly including a cylindrical rotor shaft including, encompassing, forming, and/or defining an internal channel disposed along a rotor axis; a cylindrical rotor core disposed concentrically about the cylindrical rotor shaft; a plurality of crown end windings disposed concentrically about a first end of the rotor shaft and a first end of the rotor core; and a plurality of weld end windings disposed concentrically about a second end of the rotor shaft and a second end of the rotor core; wherein the rotor shaft defines a first passage passing through a wall of the rotor shaft at the first end thereof, thereby forming a first path/passage by which a cooling fluid passes from the internal channel of the rotor shaft to the first end of the rotor core when the rotor shaft and rotor core are rotated/rotating; and wherein the rotor shaft defines a second passage passing through the wall of the rotor shaft at the second end thereof, thereby forming a second path/passage by which the cooling fluid passes from the internal channel of the rotor shaft to the second end of the rotor core when the rotor shaft and rotor core are rotated/rotating; and a stator body disposed concentrically about the rotor assembly. One or more of the first passage and the second passage are aligned perpendicular to the rotor axis such that the cooling fluid passes from the internal channel of the rotor shaft to one or more of the crown end windings and the weld end windings when the rotor shaft and rotor core are rotated/rotating. Alternatively or in combination, one or more of the first passage and the second passage are aligned non-perpendicular to the rotor axis such that the cooling fluid passes from the internal channel of the rotor shaft to one or more of the crown end windings and the weld end windings when the rotor shaft and rotor core are rotated/rotating, as well as one or more of a first bearing disposed adjacent to the first end of the rotor core and a second bearing disposed adjacent to the second end of the rotor core for cooling and lubrication. The rotor shaft defines a plurality of radially-arranged first passages passing through the wall of the rotor shaft at the first end thereof. The rotor shaft also defines a plurality of radially-arranged second passages passing through the wall of the rotor shaft at the second end thereof. One or more of the first passages has/have a relatively smaller cross-sectional diameter than a relatively larger cross-sectional diameter of one or more of the second passages, thereby balancing cooling fluid flow through the first passage(s) and the second passage(s). The motor assembly further includes a heat exchanger, a pump, and a filter, and a cooling fluid inlet tube coupled to the rotor shaft and the internal channel thereof. The motor assembly still further includes a cooling fluid sump coupled to the crown end windings and the weld end windings adapted to collect the cooling fluid from the first end of the rotor shaft and the rotor core and the second end of the rotor shaft and the rotor core and recirculate the cooling fluid to the heat exchanger.

In a further illustrative embodiment, the present disclosure provides a method for cooling a rotor/stator assembly for a motor, including: providing a cylindrical rotor shaft including, encompassing, forming, and/or defining an internal channel disposed along a rotor axis; providing a cylindrical rotor core disposed concentrically about the cylindrical rotor shaft; providing a plurality of crown end windings disposed concentrically about a first end of the rotor shaft and a first end of the rotor core; providing a plurality of weld end windings disposed concentrically about a second end of the rotor shaft and a second end of the rotor core; circulating a cooling fluid from the internal channel of the rotor shaft to the first end of the rotor core by centrifugal force when the rotor shaft and rotor core are rotated/rotating via a first passage defined through a wall of the rotor shaft at the first end thereof; and circulating the cooling fluid from the internal channel of the rotor shaft to the second end of the rotor core by centrifugal force when the rotor shaft and rotor core are rotated/rotating via a second passage defined through the wall of the rotor shaft at the second end thereof. One or more of the first passage and the second passage are aligned perpendicular to the rotor axis such that the cooling fluid passes from the internal channel of the rotor shaft to one or more of the crown end windings and the weld end windings when the rotor shaft and rotor core are rotated/rotating. Alternatively or in combination, one or more of the first passage and the second passage are aligned non-perpendicular to the rotor axis such that the cooling fluid passes from the internal channel of the rotor shaft to one or more of the crown end windings and the weld end windings when the rotor shaft and rotor core are rotated/rotating, as well as one or more of a first bearing disposed adjacent to the first end of the rotor core and a second bearing disposed adjacent to the second end of the rotor core for cooling and lubrication. The rotor shaft defines a plurality of radially-arranged first passages passing through the wall of the rotor shaft at the first end thereof. The rotor shaft also defines a plurality of radially-arranged second passages passing through the wall of the rotor shaft at the second end thereof. One or more of the first passages has/have a relatively smaller cross-sectional diameter than a relatively larger cross-sectional diameter of one or more of the second passages, thereby balancing cooling fluid flow through the first passage(s) and the second passage(s).

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF ILLUSTRATIVE EMBODIMENTS

Again, the present disclosure provides a rotor assembly and method for cooling EM end windings and lubricating rotor shaft bearings that makes use of centrifugal force generated by the rotating rotor shaft and rotor core, while minimizing component complexity and packaging volume. Conditioned fluid, such as cool oil, is pumped from a heat exchanger and enters an internal channel formed along a rotor axis of a rotor shaft via a cooling fluid inlet tube, while the rotor shaft and rotor core are rotating. The rotating rotor shaft and rotor core generate centrifugal force that pushes the cool oil through radial passages formed through the rotor shaft wall near the ends of the rotor shaft, on either side of the rotor core in the area of the crown end windings and the weld end windings, adjacent to the outlet end ring and the annulus end ring. Heat generated by the end windings due to ohmic losses is absorbed by the cool oil as the oil is sprayed onto the full internal circumference of the end windings, and the oil heats up. Hot oil drains back to an oil sump of the assembly to be recirculated back to the heat exchanger to be cooled again, as well as a pump and optional filter. By utilizing passages perpendicular to the rotor axis, the end windings are primarily cooled by the cool oil. By utilizing angled passages, the bearings in the vicinity are also lubricated, in addition to the end windings being cooled by the cool oil. The passages at either end of the rotor shaft can have different cross-sectional diameters, such that a desired oil flow balance is maintained between the two ends of the rotor shaft and rotor core and the end windings and bearings.

The utilization of an inlet oil tube and calibrated metering holes (also referred to as paths or passages herein) is intended to control and balance the oil flow distribution. Thus, oil distribution may or may not be independent of rotor speed (i.e., centrifugal loading). The oil is jetted outwards as the rotor shaft spins to provide full 360-degree coverage of the internal diameters of the end windings. This ensures complete winding wetting and prevents hot spots. In addition, this method provides effective cooling and lubrication of the roller bearings. The result is more effective heat extraction at the end windings and bearings, improved motor continuous torque ratings, higher motor torque and power outputs, enhanced reliability of an EM, including end winding enamel, varnish, and dielectric insulation, improved lubrication of the bearing system, and optimized packaging with reduced components. The need for external stator cooling channels is eliminated. This is true in both automotive (e.g., car, truck, sport utility vehicle, van, delivery vehicle, and adventure vehicle) and non-automotive applications, both of which are contemplated herein.

Figure 1:
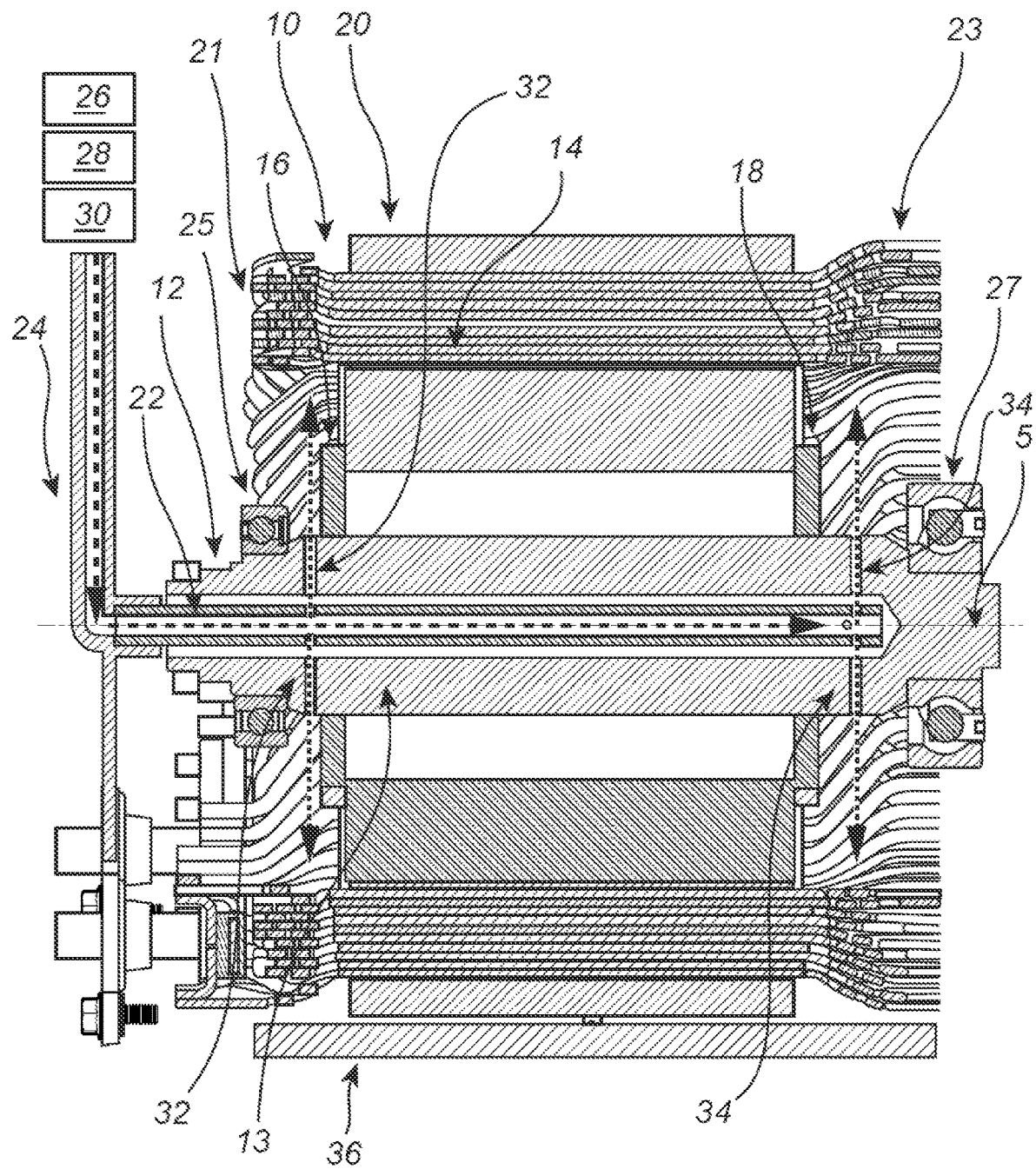
FIG. 1 is a planar cross-sectional side view of one exemplary embodiment of the rotor/stator assembly of the present disclosure, highlighting the associated internal channel and flow passages of the rotor shaft that distribute cooling fluid to the end windings.

Referring now specifically to FIG. 1, in one illustrative embodiment, the rotor/stator assembly 10 of the present disclosure generally includes a cylindrical rotor shaft 12 concentrically surrounded by a cylindrical rotor core 14. As used herein, "cylindrical" and "annular" refer to structures having a generally circular internal cross-sectional shape, and a likely a roughly circular external cross-sectional shape, although this external cross-sectional shape may vary to some degree, having flat or irregular regions. The rotor shaft 12 and rotor core 14 are configured to rotate concentrically about a common rotor axis 5 in unison, potentially at high revolutions-per-minute (RPM). The rotor shaft 12 and rotor core 14 are typically both manufactured from steel. Yet, the rotor shaft 12 and rotor core 14 may be manufactured from any metal or metal alloy, such as iron, among other possibilities. The rotor core 14 is capped at a first end by an outlet end ring 16 and at a second end by an annulus end ring 18, both of which consist of annular structures that abut the rotor core 14 but surround the rotor shaft 12.

The rotor core 14 includes a plurality of concentrically (and otherwise) arranged permanent magnets (not illustrated) fitted into slots within the rotor core 14 so that the magnets rotate with the rotor core 14, thereby interacting with the adjacent laminate stack of the stator 20 that is disposed concentrically about the rotor core 14, as in one or more such EMs described herein. These magnets may have varying sizes to fit within the slots of the rotor core 14 to reduce back electromagnetic forces and drive torque with reluctance effects. End windings 21, 23 of the stator 20, made of copper or another suitable metal or material, may protrude axially beyond the rotor core 14 and concentrically surround it, consisting of crown end windings 21 adjacent to the first end of the rotor shaft 12 and rotor core 14 and weld end windings 23 adjacent to the second end of the rotor shaft 12 and rotor core 14. The first end of the rotor shaft 12 appears adjacent to the crown end windings 21 and/or the inlet tube 24 described below. The second end of the rotor shaft 12 appears adjacent to the weld end windings 23. These end windings 21, 23 may reach high temperatures due to lamination core losses and ohmic heating as current flows through the end windings 21, 23 such that the temperatures may degrade the performance of the assembly 10, and the performance of the EM at various speeds, and must be cooled effectively. Further, the rotor shaft 12 is rotated/rotating via a first bearing assembly 25 disposed at the first end of the rotor shaft 12 and a second bearing assembly disposed at the second end of the rotor shaft. These bearings 25, 27 may also reach high temperatures that may degrade their performance, and must be cooled and lubricated effectively.

Per the present disclosure, the rotor shaft 12 defines an internal channel 22 (or cavity 22) that runs at least a portion of the length of the rotor core 14 along the rotor axis 5, and may run the full length of the rotor core 14 or more. This internal channel 22 is adapted to deliver a cooling fluid flow, such as a cool oil flow, from a cooling fluid inlet tube 24, a heat exchanger 26, a pump 28, and an optional filter 30 through the rotor shaft 12. As illustrated, the internal channel 22 of the rotor shaft 12 is a cylindrical channel, although any suitable cross-sectional shape may be utilized, provided that the channel 22 is elongated and substantially traverses the length of the rotor core 14.

The rotor shaft 12 defines a first series of concentrically-arranged, radially-aligned passages 32 passing through a wall 13 of the rotor shaft 12 at the first end thereof, thereby forming a first series of paths by which the cooling fluid passes by pumping (e.g., with pump 28) and centrifugal force from the internal channel 22 of the rotor shaft 12 to the first end of the rotor core 14 adjacent to the outlet end ring 16 when the rotor shaft 12 and rotor core 14 are rotated/rotating. The rotor shaft 12 also defines (in combination or in the alternative) a second series of concentrically-arranged, radially-aligned passages 34 passing through the wall 13 of the rotor shaft 12 at the second end thereof, thereby forming a second series of paths by which the cooling fluid passes by pumping (e.g., with pump 28) and centrifugal force from the internal channel 22 of the rotor shaft 12 to the second end of the rotor core 14 adjacent to the annulus end ring 18 when the rotor shaft 12 and rotor core 14 are rotated/rotating. In this illustrative embodiment, the passages 32, 34 are aligned perpendicular to the rotor shaft 12 and/or rotor axis 5 such that the cooling fluid passes from the internal channel 22 of the rotor shaft 12 to one or more of the crown end windings 21 and the weld end windings 23 when the rotor shaft 12 and rotor core 14 are rotated/rotating, thereby cooling their entire internal diameter of the rotor shaft 12 and the rotor core 14 at this point.

After this cooling is accomplished, the now hot cooling fluid is collected in the cooling fluid sump 36 before being eventually recirculated to the heat exchanger 26, pump 28, and filter 30.

Figure 2:
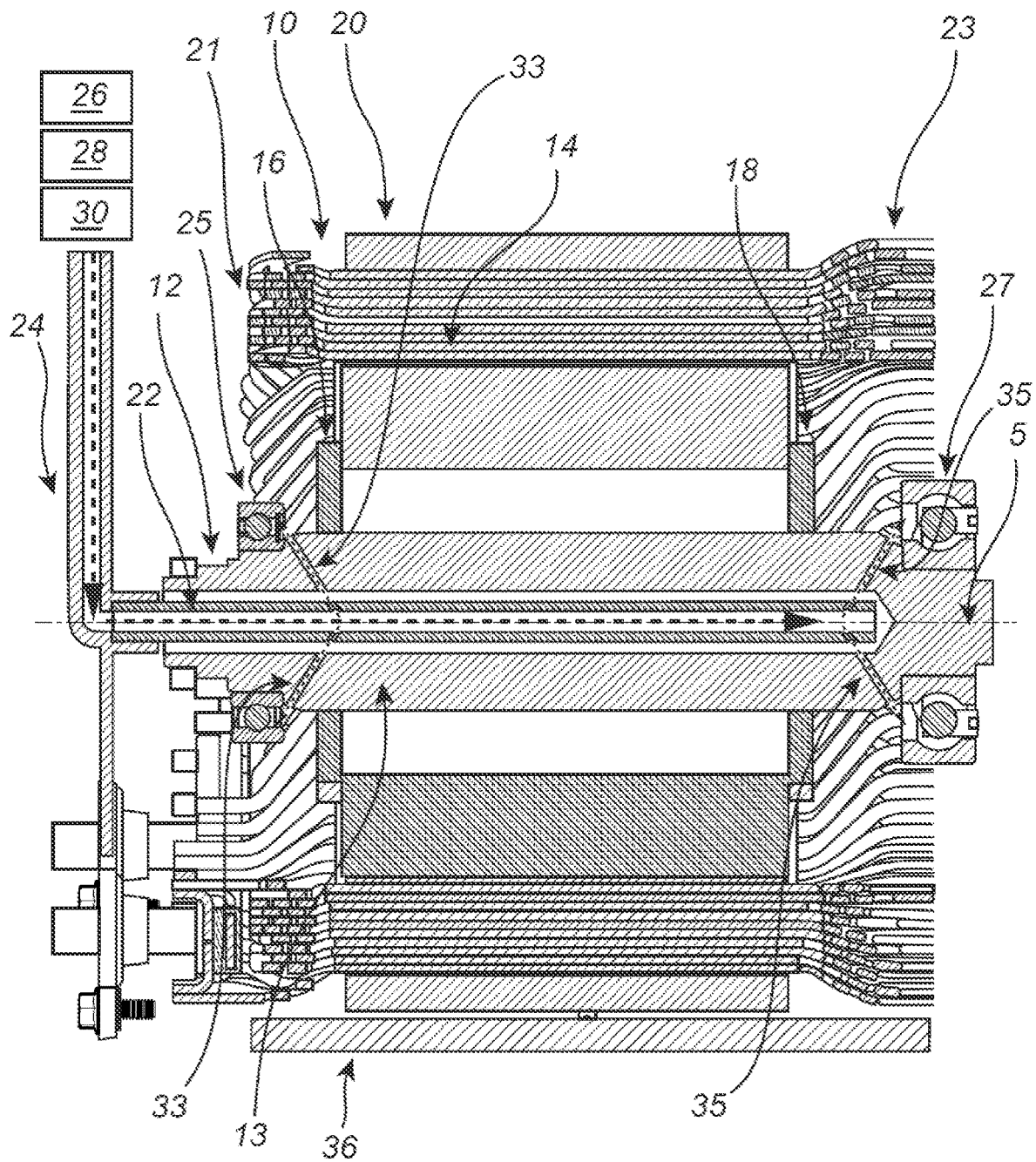
FIG. 2 is a cross-sectional planar side view of another exemplary embodiment of the rotor/stator assembly of the present disclosure, highlighting the associated internal channel and flow passages of the rotor shaft that distribute cooling and lubricating fluid to the end windings and bearings.

Referring now specifically to FIG. 2, in another illustrative embodiment, the rotor/stator assembly 10 of the present disclosure again generally includes a cylindrical rotor shaft 12 concentrically surrounded by a cylindrical rotor core 14. The rotor shaft 12 and rotor core 14 are configured to rotate concentrically about a common rotor axis 5 in unison, potentially at high RPM. The rotor shaft 12 and rotor core 14 are typically both manufactured from steel. Yet, the rotor shaft 12 and rotor core 14 may be manufactured from any metal or metal alloy, such as iron, among other possibilities. The rotor core 14 is capped at a first end (e.g., a forward end as shown in FIG. 2) by a forward end ring (e.g., an outlet end ring 16 as shown in FIG. 2) and at a second end (e.g., an aft end as shown in FIG. 2) by an aft end ring (e.g., an annulus end ring 18 as shown in FIG. 2), both of which consist of annular structures that abut the rotor core 14 (e.g., the forward end or the aft end of the rotor core 14, respectively, and as shown in FIG. 2) but surround the rotor shaft 12.

The rotor core 14 includes a plurality of concentrically (and otherwise) arranged permanent magnets (not illustrated) fitted into slots within the rotor core 14 so that the magnets rotate with the rotor core 14, thereby interacting with the adjacent laminate stack of the stator 20 that is disposed concentrically about the rotor core 14, as in one or more such EMs described herein. These magnets may have varying sizes to fit within the slots of the rotor core 14 to reduce back electromagnetic forces and drive torque with reluctance effects. End windings 21, 23 of the stator 20, made of copper or another suitable metal or material, may protrude axially beyond the rotor core 14 and concentrically surround it, consisting of crown end windings 21 adjacent to the first end of the rotor shaft 12 and rotor core 14 and weld end windings 23 adjacent to the second end of the rotor shaft 12 and rotor core 14. The first end of the rotor shaft 12 appears adjacent to the crown end windings 21 and/or the inlet tube 24 described below. The second end of the rotor shaft 12 appears adjacent to the weld end windings 23. These end windings 21, 23 may reach high temperatures due to lamination core losses and ohmic heating as current flows through the end windings 21, 23 such that the temperatures may degrade the performance of the assembly 10, and the performance of the EM at various speeds, and must be cooled effectively. Further, the rotor shaft 12 is rotated/rotating via a first bearing assembly 25 disposed at the first end of the rotor shaft 12 and a second bearing assembly disposed at the second end of the rotor shaft. These bearings 25, 27 may also reach high temperatures that may degrade their performance, and must be cooled and lubricated effectively.

Per the present disclosure, the rotor shaft 12 defines an internal channel 22 (or cavity 22) that runs at least a portion of the length of the rotor core 14 along the rotor axis 5, and may run the full length of the rotor core 14 or more. This internal channel 22 is adapted to deliver a cooling fluid flow, such as a cool oil flow, from a cooling fluid inlet tube 24, a heat exchanger 26, a pump 28, and an optional filter 30 through the rotor shaft 12. As illustrated, the internal channel 22 of the rotor shaft 12 is a cylindrical channel, although any suitable cross-sectional shape may be utilized, provided that the channel 22 is elongated and substantially traverses the length of the rotor core 14.

The rotor shaft 12 again defines a first series of concentrically-arranged, radially-aligned passages 33 passing through a wall 13 of the rotor shaft 12 at the first end thereof (e.g., each passage 33 defining a passage outlet in a radially exterior surface of the wall 13 of the rotor shaft 12 forward of the forward end ring and/or the outlet end ring 16 as shown in FIG. 2), thereby forming a first series of paths by which the cooling fluid passes by pumping (e.g., with pump 28) and centrifugal force from the internal channel 22 of the rotor shaft 12 to the first end of the rotor core 14 adjacent to the outlet end ring 16 when the rotor shaft 12 and rotor core 14 are rotated/rotating. The rotor shaft 12 also defines (in combination or in the alternative) a second series of concentrically-arranged, radially-aligned passages 35 passing through the wall 13 of the rotor shaft 12 at the second end thereof (e.g., each passage 35 defining a passage outlet in a radially exterior surface of the wall 13 of the rotor shaft 12 aft of the aft end ring and/or the annulus end ring 18 as shown in FIG. 2), thereby forming a second series of paths by which the cooling fluid passes by pumping (e.g., with pump 28) and centrifugal force from the internal channel 22 of the rotor shaft 12 to the second end of the rotor core 14 adjacent to the annulus end ring 18 when the rotor shaft 12 and rotor core 14 are rotated/rotating. In this illustrative embodiment, the passages 33, 35 are aligned non-perpendicular to the rotor axis 5 such that the cooling fluid passes from the internal channel 22 of the rotor shaft 12 to one or more of the crown end windings 21 and the weld end windings 23, as well as to lubricate the bearing assemblies 25, 27, when the rotor shaft 12 and rotor core 14 are rotated/rotating, thereby still cooling their entire internal diameter at this point. Preferably, the passages 33, 35 here are angled to more precisely direct the lubricating cooling fluid flow to the bearing assemblies 25, 27. Such angled passages 33, 35 can be used in place of or in combination with the perpendicular passages 32, 34 of FIG. 1, such as in a concentrically-alternating configuration or the like.

After this cooling and lubricating is accomplished, the now hot cooling fluid is again collected in the cooling fluid sump 36 before being eventually recirculated to the heat exchanger 26, pump 28, and filter 30.

In either or both of the illustrative embodiments of FIG. 1 and FIG. 2, the first passages 32, 33 may have a relatively smaller cross-sectional diameter than a relatively larger cross-sectional diameter of the second passages 34, 35, thereby balancing cooling fluid flow through the first passages 32, 33 and the second passages 34, 35 and thus cooling of the crown end windings 21 and the weld end windings 23 and lubrication of the first bearing assembly 25 and the second bearing assembly 27. For example, the first passages 32, 33 may have a smaller cross-sectional diameter, such that some fluid from the inlet tube 24 entering the internal channel 22 (e.g., a first portion the cooling fluid pumped into the internal channel 22) passes to the first passages 32, 33. Further, based on the smaller cross-sectional diameters of the first passages 32, 33, additional fluid (e.g., a second portion the cooling fluid pumped into the internal channel 22) from the inlet tube 24 continues passing in the internal channel 22 past the first passages 32, 33 and further to the second passages 34, 35. More fluid constriction is provided at the first end of the rotor assembly 10, where the pump pressure is higher, than at the second end of the rotor assembly 10 via this cross-sectional diameter difference.

Figure 3:
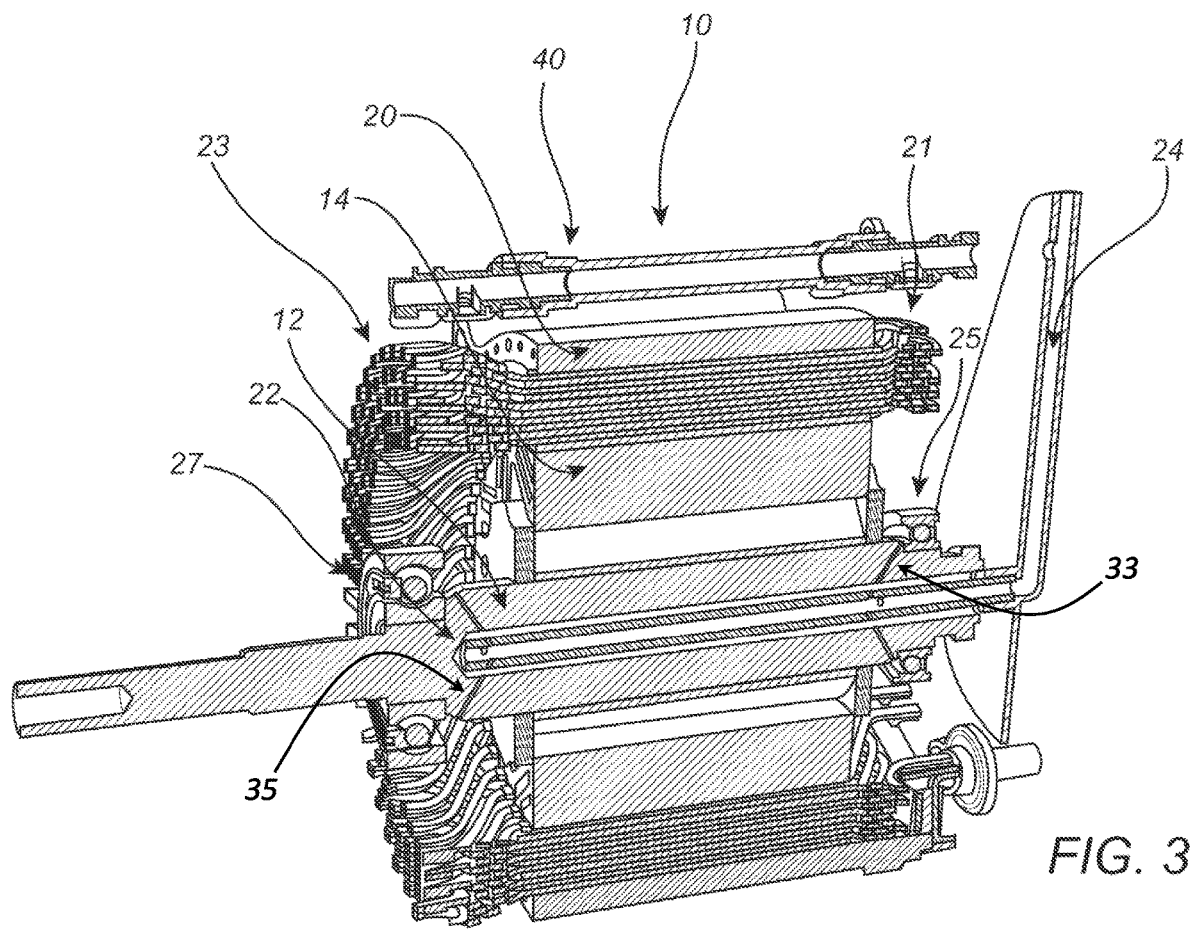
FIG. 3 is a cut-away partial perspective view of the rotor/stator assembly of FIG. 2.

FIG. 3 is a partial perspective view of the rotor/stator assembly 10 of FIG. 2, in which the rotor shaft 12, rotor core 14, stator 20, internal channel 22, inlet tube 24, end windings 21, 23, and bearing assemblies 25, 27 can be seen. Here, a cooling fluid spray baffle 40 typically used to cooling the end windings 21, 23 can also be seen, however, the internal cooling system of the present disclosure provides superior cooling (and lubrication) performance.

Figure 4:
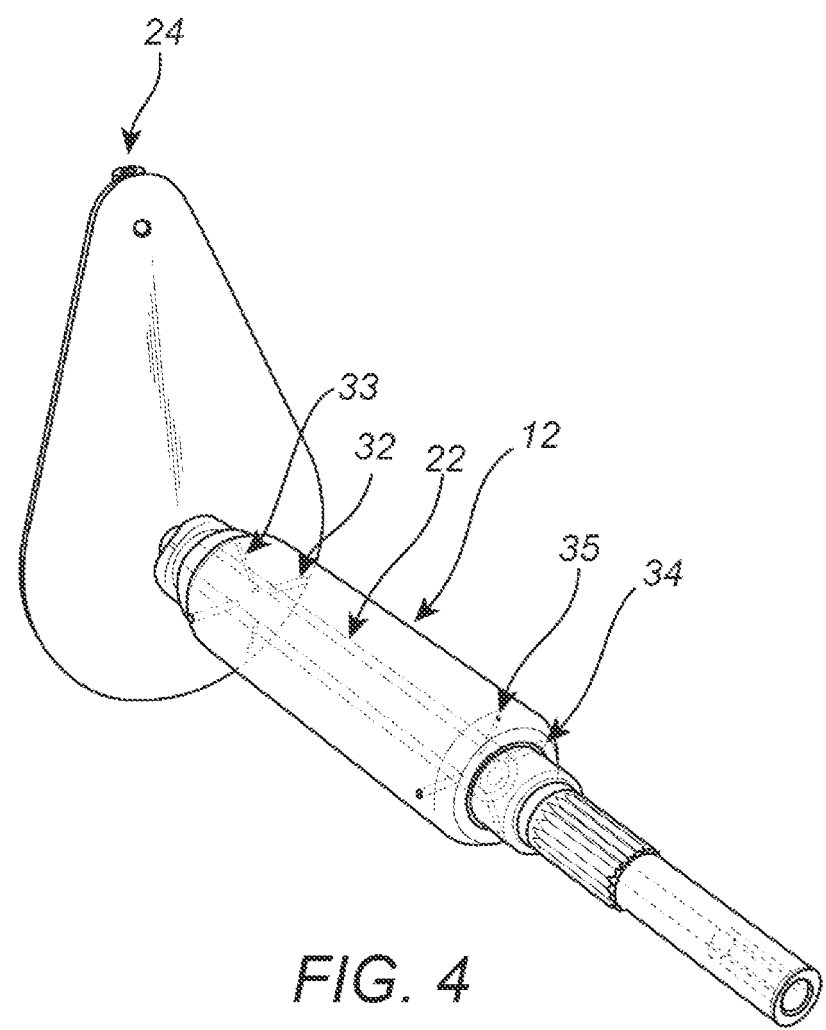
FIG. 4 is a perspective view of the rotor shaft and cooling fluid inlet tube of the rotor/stator assembly of FIGS. 1 and 2, highlighting the associated internal channel of the rotor shaft, flow passages that distribute cooling fluid to the end windings, and flow passages that distribute cooling and lubricating fluid to the end windings and bearings, when used in combination.

FIG. 4 is a perspective view of the rotor shaft 12 and cooling fluid inlet tube 24 of the rotor/stator assembly 10 of FIGS. 1 and 2, highlighting the associated internal channel 22 of the rotor shaft 12, flow passages 32, 34 that distribute cooling fluid to the end windings 21, 23, respectively, and flow passages 34, 35 that distribute cooling and lubricating fluid to the end windings 21, 23 and bearings 25, 27, respectively, as described above. Notably, when used in combination, passages 32, 34 may distribute the cooling fluid to the end windings 21, 23, respectively. Yet, passages 34, 35 may distribute the cooling fluid to the end windings 21, 23, respectively, and may also distribute the cooling fluid to the bearings 25, 27. As illustrated, around the circumference of the rotor shaft 12, the perpendicular passages 32, 34 cooling the end windings 21, 23 are disposed at 0 and 180 degrees, while the angled passages 34, 35 cooling the end windings 21, 23 and lubricating the bearings 25, 27 are disposed at 90 and 270 degrees, although different arrangements and periodicities are of course possible.

Figure 5:
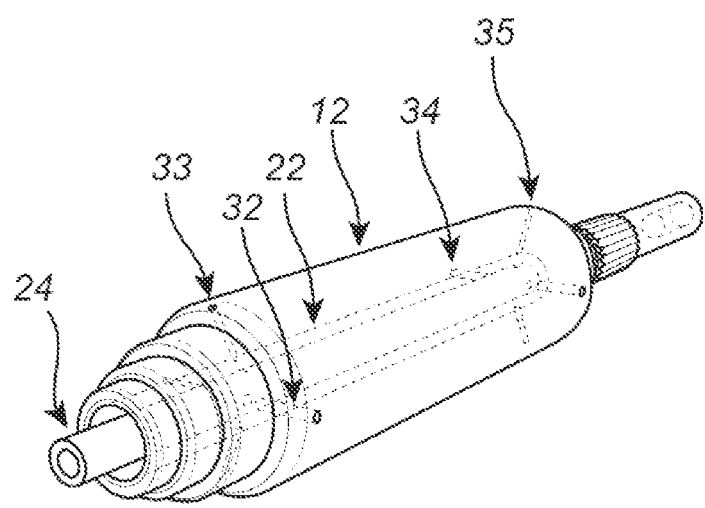
FIG. 5 is a perspective view of the rotor shaft of the rotor/stator assembly of FIGS. 1 and 2, again highlighting the associated internal channel of the rotor shaft, flow passages that distribute cooling fluid to the end windings, and flow passages that distribute cooling and lubricating fluid to the end windings and bearings, when used in combination.

FIG. 5 is a perspective view of the rotor shaft 12 of the rotor/stator assembly 10 of FIGS. 1 and 2, again highlighting the associated internal channel 22 of the rotor shaft 12, flow passages 32, 34 that distribute cooling fluid to the end windings 21, 23, and flow passages 33, 35 that distribute cooling and lubricating fluid to the end windings 21, 23 described above and bearings 25, 27, when used in combination. Again, as illustrated, around the circumference of the rotor shaft 12, the perpendicular passages 32, 34 cooling the end windings 21, 23 are disposed at 0 and 180 degrees, while the angled passages 33, 35 cooling the end windings 21, 23 and lubricating the bearings 25, 27 are disposed at 90 and 270 degrees, although different arrangements and periodicities are of course possible.

Figure 6:
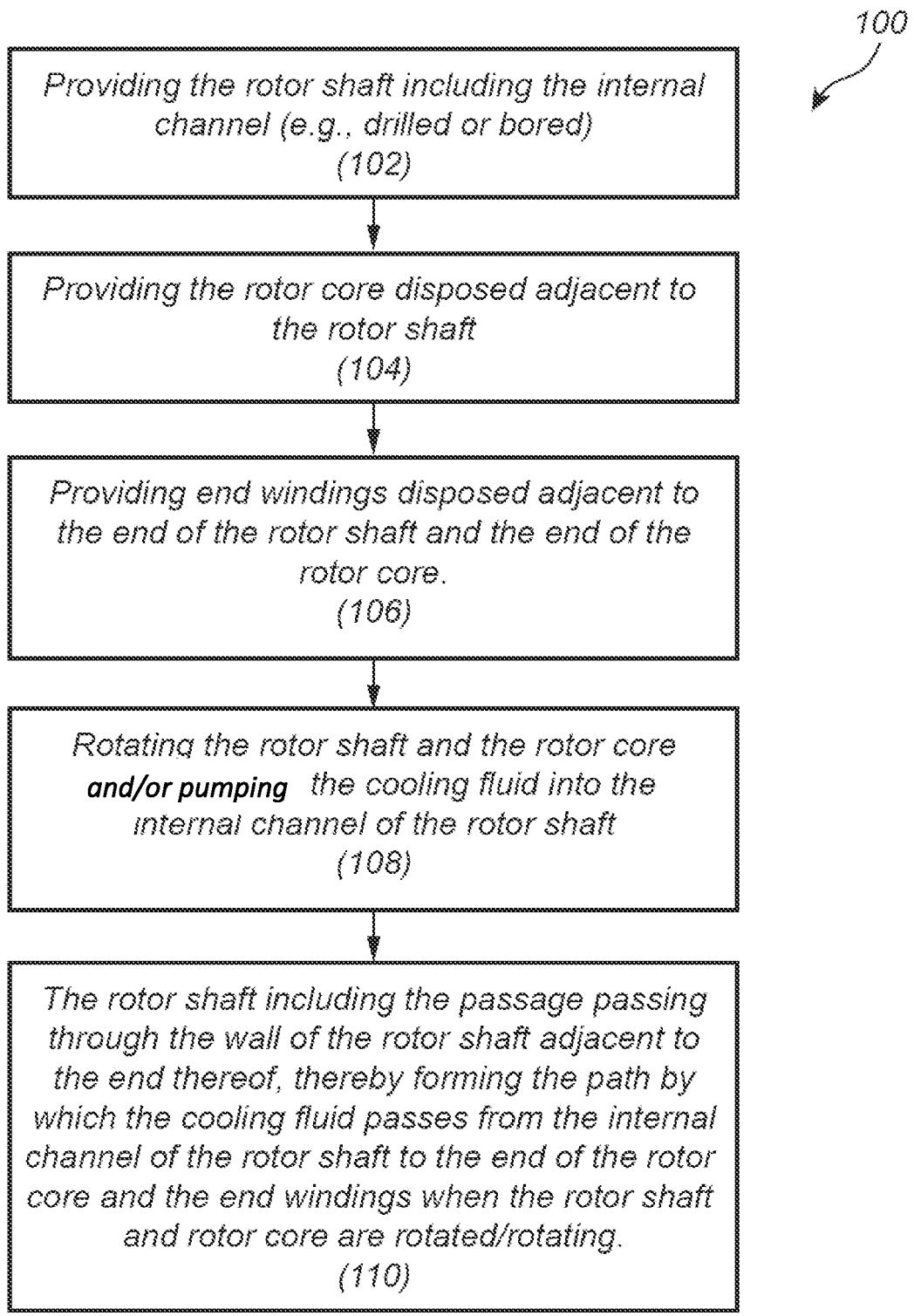
FIG. 6 is a flowchart of one exemplary embodiment of the rotor/stator operation method of the present disclosure, highlighting the functionality of the associated internal channel and flow passages of the rotor shaft that distribute cooling fluid to the end windings when the rotor shaft and rotor core are rotated, by centrifugal and/or pumping force.

FIG. 6 further provides a method 100 for cooling a rotor/stator assembly 10 for a motor, including: providing a cylindrical rotor shaft 12 including, encompassing, forming, and/or defining an internal channel 22 disposed along a rotor axis 5 (step 102), such as by drilling or boring; providing a cylindrical rotor core 14 disposed concentrically about the cylindrical rotor shaft 12 (step 104); providing a plurality of crown end windings 21 disposed concentrically about a first end of the rotor shaft 12 and the rotor core 14 (step 106); providing a plurality of weld end windings 23 disposed concentrically about a second end of the rotor shaft 12 and the rotor core 14 (step 106); circulating a cooling fluid from the internal channel 22 of the rotor shaft 12 to the first end of the rotor core 14 by rotating the rotor shaft 12 and the rotor core 14 (step 108), whereby centrifugal force is created when the rotor shaft 12 and rotor core 14 are rotated/rotating, via a first passage 32, 33 defined through a wall of the rotor shaft 12 at the first end thereof (step 110); and circulating the cooling fluid from the internal channel 22 of the rotor shaft 12 to the second end of the rotor core 14 by centrifugal force when the rotor shaft 12 and rotor core 14 are rotated/rotating via a second passage 34, 35 defined through the wall of the rotor shaft 12 at the second end thereof (step 110). Optionally, one or more of the first passage 32 and the second passage 34 are aligned perpendicular to the rotor shaft 12 and/or the rotor axis 5 such that the cooling fluid passes from the internal channel 22 of the rotor shaft 12 to one or more of the crown end windings 21 and the weld end windings 23 when the rotor shaft 12 and rotor core 14 are rotated/rotating. Alternatively, one or more of the first passage 33 and the second passage 35 are aligned non-perpendicular to the rotor shaft 12 and/or the rotor axis 5 such that the cooling fluid passes from the internal channel 22 of the rotor shaft 12 to one or more of the crown end windings 21 and the weld end windings 23 when the rotor shaft 12 and rotor core 14 are rotated/rotating, as well as one or more of a first bearing 25 disposed adjacent to the first end of the rotor core 14 and a second bearing 27 disposed adjacent to the second end of the rotor core 14 for cooling and lubrication. The rotor shaft 12 defines a plurality of radially-arranged first passages 32, 33 passing through the wall of the rotor shaft 12 at the first end thereof. The rotor shaft 12 also defines a plurality of radially-arranged second passages 34, 35 passing through the wall of the rotor shaft 12 at the second end thereof. The first passage(s) 32, 33 has/have a relatively smaller cross-sectional diameter than a relatively larger cross-sectional diameter of the second passage(s) 34, 35, thereby balancing cooling fluid flow through the first passage(s) 32, 33 and the second passage(s) 34, 35.

Again, the utilization of an inlet oil tube and calibrated metering holes, paths, or passages is intended to control and balance the oil flow distribution. Thus, oil distribution may or may not be independent of rotor speed (i.e., centrifugal loading). The oil is jetted outwards as the rotor shaft spins to provide full 360-degree coverage of the internal diameters of the end windings. This ensures complete winding wetting and prevents hot spots. In addition, this method provides effective cooling and lubrication of the roller bearings. The result is effective heat extraction at the end windings and bearings, improve motor continuous torque ratings, high motor torque and power outputs, reliability of an EM, including end winding enamel, varnish, and dielectric insulation, improved lubrication of the bearing system, and optimized packaging with reduced components. The need for external stator cooling channels is eliminated. This is true in both automotive (e.g., car, truck, sport utility vehicle, van, delivery vehicle, and adventure vehicle) and non-automotive applications, both of which are contemplated herein.

The present disclosure also provides a rotor cooling assembly and method by which conditioned oil from a heat exchanger fills a rotor shaft cavity, while the rotor shaft is spinning at high speeds. With the rotor shaft spinning, centrifugal force pushes the oil radially into one or more passages disposed through the rotor shaft, where each passage extends from the rotor shaft cavity to an annulus end cavity. Such passages may be 180 degrees apart from other passages in the rotor shaft. Further, passages may be 90 degrees apart, or periodic with any other suitable spacing around the rotor shaft. Via these passages, the oil fills the annulus end cavity of the rotor assembly. As the oil continuously fills the annulus end cavity, it is necessarily forced through provided axial rotor core channels, parallel to the source rotor shaft cavity, but in an opposite flow direction from the direction conditioned oil fills the rotor shaft cavity. Heat generated by rotor core loss and magnet eddy current loss is absorbed by the oil in both channels. Further, restricting outlet ports provided on the outlet end ring, opposite the annulus end ring, allow the oil to exit the rotor core channels, but restrict enough flow that a fluid film is promoted inside the various channels, further increasing heat dissipation effectiveness. The hot oil exits the outlet end ring ports and travels radially outwards to further cool the stator end windings, which are typically cooled primarily by an adjacent baffle blowing cooling oil. The utilization of centrifugal force to move the oil, filling the rotor shaft cavity with a volume of oil, and providing radial passages to direct the oil to a cavity formed between the annulus end ring and the lamination core stack surface provides superior heat dissipation in a compact arrangement. As the oil flows through the various channels, heat generated from rotor losses is absorbed and circulated out of the system, actively cooling the rotor assembly during operation.

In a general sense, heat extraction from the rotor magnets and lamination core directly impacts machine performance, increasing continuous power and torque output. Such heat extraction allows the motor to spin faster, enabling a wide revolutions-per-minute (RPM) operating range. The reliability of the EM is increased significantly. Keeping the rotor assembly cooler results in higher power output and longer duration at peak torque, without the system degrading due to thermal limitations. This is advantageous in both automotive (e.g., electric vehicle) and other applications.

Figure 7:
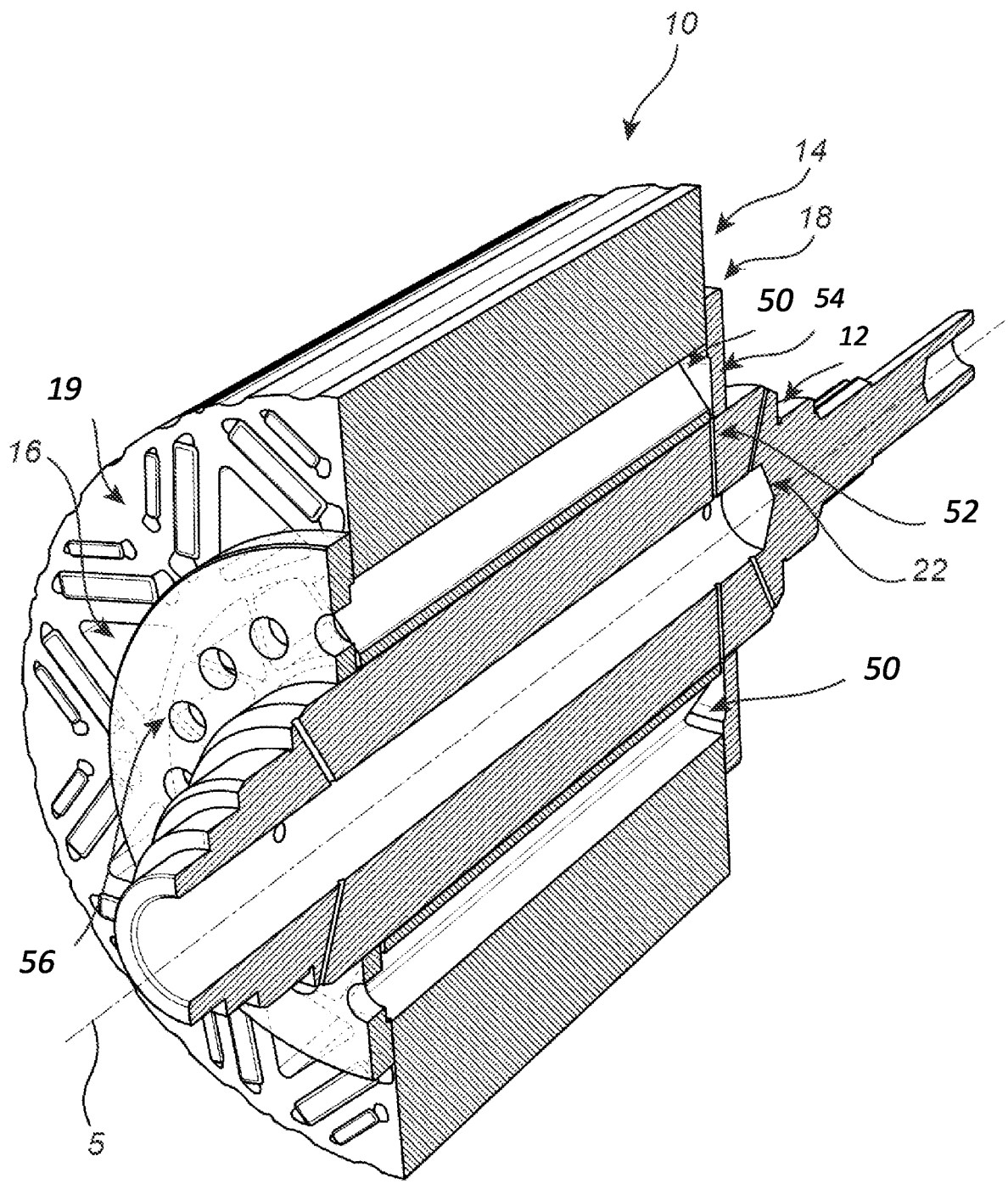
FIG. 7 is a cut-away perspective view of another illustrative embodiment of the rotor assembly of the present disclosure, highlighting the associated outlet end ring and interconnected cooling fluid cavity/channels of the associated rotor shaft and rotor core.

Referring now specifically to FIG. 7, in another illustrative embodiment, the rotor assembly 10 of the present disclosure generally includes a cylindrical rotor shaft 12 concentrically surrounded by a cylindrical rotor core 14. As used here, "cylindrical" and "annular" again refer to structures having a generally circular internal cross-sectional shape, and a likely a roughly circular external cross-sectional shape, although this external cross-sectional shape may vary to some degree, having flat or irregular regions. The rotor shaft 12 and rotor core 14 are configured to rotate concentrically about a common rotor assembly axis 5 in unison, potentially at high RPM. The rotor shaft 12 and rotor core 14 are typically both manufactured from steel. The rotor core 14 is capped at a first end by an outlet end ring 16 and at a second end by an annulus end ring 16, both of which consist of annular structures that abut the rotor core 14 but surround the rotor shaft 12.

The rotor core 14 includes a plurality of concentrically (and otherwise) arranged permanent magnets 19 that rotate with the rotor core 14, thereby interacting with the adjacent stator 20 (see FIG. 11), as in a variety of such EMs. These magnets 19 may have varying forms and sizes, such as solid magnets, segmented magnets, and other separated magnets to reduce eddy currents, thereby preventing overheating and demagnetization. Copper end windings (not illustrated) or the like may also be provided.

Per the present disclosure, the rotor shaft 12 defines an internal cavity (or channel) 22 that runs at least the length of the rotor core 14 along the rotor assembly axis 5. The rotor core 14 also defines an internal channel 50 that runs the length of the rotor core 14, parallel to the internal cavity 22 of the rotor shaft 12, but disposed radially outwards of the internal cavity 22 of the rotor shaft 12 and the rotor assembly axis 5. Each of these internal cavity/channels 22, 50 is configured to transport a cooling fluid flow, such as an oil flow, through the corresponding component 12, 14. As illustrated, the internal cavity 22 of the rotor shaft 12 is a cylindrical cavity, while the internal channel 50 of the rotor core 14 is a prismatic channel, although any suitable cross-sectional shapes may be utilized, provided that each of the cavity/channels 22, 50 is elongated and substantially traverses the length of the rotor core 14. It should be noted that the internal channel 50 of the rotor core 14 may be any desired radial distance from the rotor assembly axis 5 and the internal cavity 22 of the rotor shaft 12, however the internal channel 50 of the rotor core 14 is generally disposed inside of and/or adjacent to the magnets 19 of the rotor core 14. It should also be noted that, although a singular rotor core internal channel 50 is typically described herein for simplicity, multiple concentrically arranged such rotor core internal channels 24 are preferably utilized and balanced around the periphery of the rotor core 14, all coupled to a single, central rotor shaft internal cavity 22.

In terms of flow direction, the cooling fluid is delivered from a heat exchanger 26 (see FIG. 11), pump 28 (see FIG. 11), and optional filter 30 (see FIG. 11) external to the rotor assembly 10, to the internal cavity 22 of the rotor shaft 12 and internal channel 50 of the rotor core 14 in series. The cooling fluid flows into an inlet end of the internal cavity 22 of the rotor shaft 12 at the first end of the rotor assembly 10 including the outlet end ring 16 and flows along the rotor assembly axis 5 to an outlet end of the internal cavity 22 of the rotor shaft 12 at the second end of the rotor assembly 10 including the annulus end ring 18, and then flows into an inlet end of the internal channel 50 of the rotor core 14 at the second end of the rotor assembly 10 including the annulus end ring 18 and flows parallel to the rotor assembly axis 5 to an outlet end of the internal channel 50 of the rotor core 14 at the first end of the rotor assembly 10 including the outlet end ring 16, before being returned to the heat exchanger 26, pump 28, and filter 30. The cooling fluid is cool entering the rotor assembly 10 and hot leaving the rotor assembly 10, having absorbed unwanted heat from the rotor shaft 12 and rotor core 14. The pump 28, in part, provides motive force for forcing the cooling fluid through the rotor shaft 12 and rotor core 14.

The cooling fluid is transported by centrifugal force, as the rotor assembly 10 spins, from the outlet end of the internal cavity 22 of the rotor shaft 12 to the inlet end of the internal channel 50 of the rotor core 14 by a plurality of radially-oriented passages 52 formed through the wall of the rotor shaft 12, as well as an annulus cavity 54 disposed between the annulus end ring 18 and the second end of the rotor core 14, and specifically the laminate stack of the rotor core 14. This cavity 54 may be formed by a recess manufactured into one or both of the annulus end ring 18 and the second end of the rotor core 14. Thus, a cooling fluid flow path is provided through the internal cavity 22 of the rotor shaft 12, the passages 52, the annulus cavity 54, and the internal channels 24 of the rotor core 14, with the use of both the passages 52 and the cavity 54 being optional. For example, the passages 52 may directly couple the internal cavity 22 of the rotor shaft 12 to the internal channels 24 of the rotor core 14, or the internal cavity 22 of the rotor shaft 12 and the internal channels 24 of the rotor core 14 may both directly intersect the cavity 54. The passages 52 and the cavity 54 provide a centrifugal force flow path for the cooling fluid as the rotor assembly 10 is spun, in part providing further motive force for forcing the cooling fluid through the rotor shaft 12 and rotor core 14.

The outlet end ring 16 includes a plurality of outlet ports 56 corresponding to the plurality of rotor core internal channels 24 that may or may not serve to partially constrict the cooling fluid flow out of the plurality of rotor core internal channels 24. In the event that such constriction is provided, the cooling fluid is encouraged to coat the surfaces of the plurality of rotor core internal channels 24 and the surface of the rotor shaft internal channel, thereby enhancing cooling capabilities. Once leaving the rotor core internal channels 24, the cooling fluid travels radially outwards to potentially cool the copper end windings or other structures mentioned above and ultimately be returned to the heat exchanger 26, pump 28, and filter 30, before the circuit is repeated after the collected heat has been expelled external to the rotor assembly 10.

Figure 8:
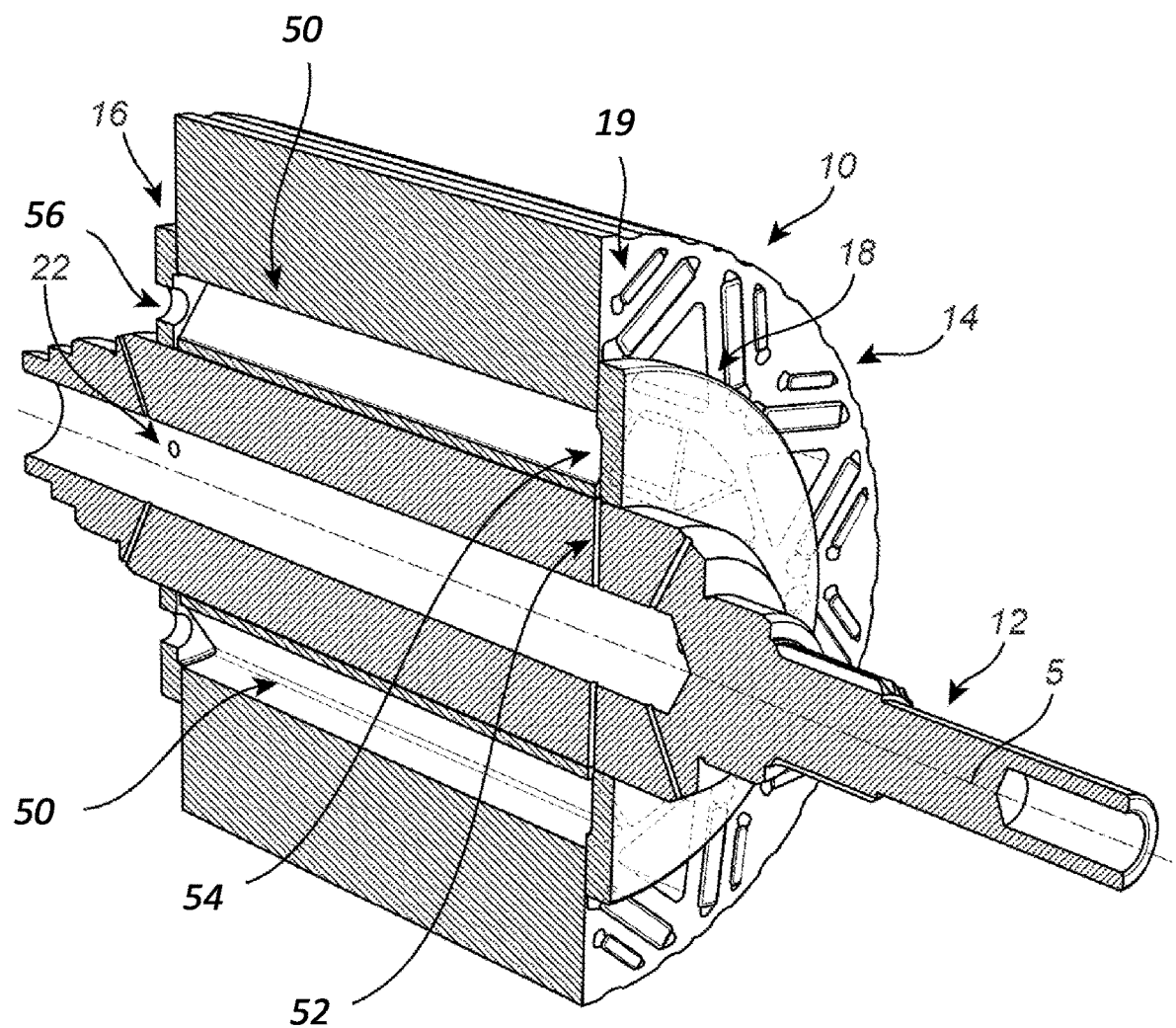
FIG. 8 is another cut-away perspective view of another illustrative embodiment of the rotor assembly of the present disclosure, highlighting the associated annulus end ring and interconnected cooling fluid cavity/channels of the associated rotor shaft and rotor core.

Referring now specifically to FIG. 8, in one illustrative embodiment, the rotor assembly 10 of the present disclosure generally includes a cylindrical rotor shaft 12 concentrically surrounded by a cylindrical rotor core 14. The rotor shaft 12 and rotor core 14 are configured to rotate concentrically about a common rotor assembly axis 5 in unison, potentially at high RPM. The rotor shaft 12 and rotor core 14 are typically both manufactured from steel. The rotor core 14 is capped at a first end by an outlet end ring 16 and at a second end by an annulus end ring 16, both of which consist of annular structures that abut the rotor core 14 but surround the rotor shaft 12.

Again, the rotor core 14 includes a plurality of concentrically (and otherwise) arranged permanent magnets 19 that rotate with the rotor core 14, thereby interacting with the adjacent stator 20 (see FIG. 11), as in such EMs discussed herein. These magnets 19 may have varying sizes. Copper end windings (not illustrated) or the like may also be provided.

The rotor shaft 12 defines an internal cavity 22 that runs at least the length of the rotor core 14 along the rotor assembly axis 5. The rotor core 14 also defines an internal channel 50 that runs the length of the rotor core 14, parallel to the internal cavity 22 of the rotor shaft 12, but disposed radially outwards of the internal cavity 22 of the rotor shaft 12 and the rotor assembly axis 5. Each of these internal cavity/channels 22, 50 is configured to transport a cooling fluid flow, such as an oil flow, through the corresponding component 12, 14. As illustrated, the internal cavity 22 of the rotor shaft 12 is a cylindrical cavity, while the internal channel 50 of the rotor core 14 is a prismatic channel, although any suitable cross-sectional shapes may be utilized, provided that each of the cavity/channels 22, 50 is elongated and substantially traverses the length of the rotor core 14. It should be noted that the internal channel 50 of the rotor core 14 may be any desired radial distance from the rotor assembly axis 5 and the internal cavity 22 of the rotor shaft 12, however the internal channel 50 of the rotor core 14 is generally disposed inside of and/or adjacent to the magnets 19 of the rotor core 14. It should also be noted that, although a singular rotor core internal channel 50 is typically described herein for simplicity, multiple concentrically arranged such rotor core internal channels 24 are preferably utilized and balanced around the periphery of the rotor core 14, all coupled to a single, central rotor shaft internal cavity 22.

In terms of flow direction, the cooling fluid is delivered from a heat exchanger 26 (see FIG. 11), pump 28 (see FIG. 11), and optional filter 30 (see FIG. 11) external to the rotor assembly 10, to the internal cavity 22 of the rotor shaft 12 and internal channel 50 of the rotor core 14 in series. The cooling fluid flows into an inlet end of the internal cavity 22 of the rotor shaft 12 at the first end of the rotor assembly 10 including the outlet end ring 16 and flows along the rotor assembly axis 5 to an outlet end of the internal cavity 22 of the rotor shaft 12 at the second end of the rotor assembly 10 including the annulus end ring 18, and then flows into an inlet end of the internal channel 50 of the rotor core 14 at the second end of the rotor assembly 10 including the annulus end ring 18 and flows parallel to the rotor assembly axis 5 to an outlet end of the internal channel 50 of the rotor core 14 at the first end of the rotor assembly 10 including the outlet end ring 16, before being returned to the heat exchanger 26, pump 28, and filter 30. The cooling fluid is cool entering the rotor assembly 10 and hot leaving the rotor assembly 10, having absorbed unwanted heat from the rotor shaft 12 and rotor core 14. The pump 28, in part, provides motive force for forcing the cooling fluid through the rotor shaft 12 and rotor core 14.

The cooling fluid is transported by centrifugal force, as the rotor assembly 10 spins, from the outlet end of the internal cavity 22 of the rotor shaft 12 to the inlet end of the internal channel 50 of the rotor core 14 by a plurality of radially-oriented passages 52 formed through the wall of the rotor shaft 12, as well as an annulus cavity 54 disposed between the annulus end ring 18 and the second end of the rotor core 14, and specifically the laminate stack of the rotor core 14. This cavity 54 may be formed by a recess manufactured into one or both of the annulus end ring 18 and the second end of the rotor core 14. Thus, a cooling fluid flow path is provided through the internal cavity 22 of the rotor shaft 12, the passages 52, the annulus cavity 54, and the internal channels 24 of the rotor core 14, with the use of both the passages 52 and the cavity 54 being optional. For example, the passages 52 may directly couple the internal cavity 22 of the rotor shaft 12 to the internal channels 24 of the rotor core 14, or the internal cavity 22 of the rotor shaft 12 and the internal channels 24 of the rotor core 14 may both directly intersect the cavity 54. The passages 52 and the cavity 54 provide a centrifugal force flow path for the cooling fluid as the rotor assembly 10 is spun, in part providing further motive force for forcing the cooling fluid through the rotor shaft 12 and rotor core 14.

Again, the outlet end ring 16 includes a plurality of outlet ports 56 corresponding to the plurality of rotor core internal channels 24 that may or may not serve to partially constrict the cooling fluid flow out of the plurality of rotor core internal channels 24. In the event that such constriction is provided, the cooling fluid is encouraged to coat the surfaces of the plurality of rotor core internal channels 24 and the surface of the rotor shaft internal channel, thereby enhancing cooling capabilities. Once leaving the rotor core internal channels 24, the cooling fluid travels radially outwards to potentially cool the copper end windings or other structures mentioned above and ultimately be returned to the heat exchanger 26, pump 28, and filter 30, before the circuit is repeated after the collected heat has been expelled external to the rotor assembly 10.

Figure 9:
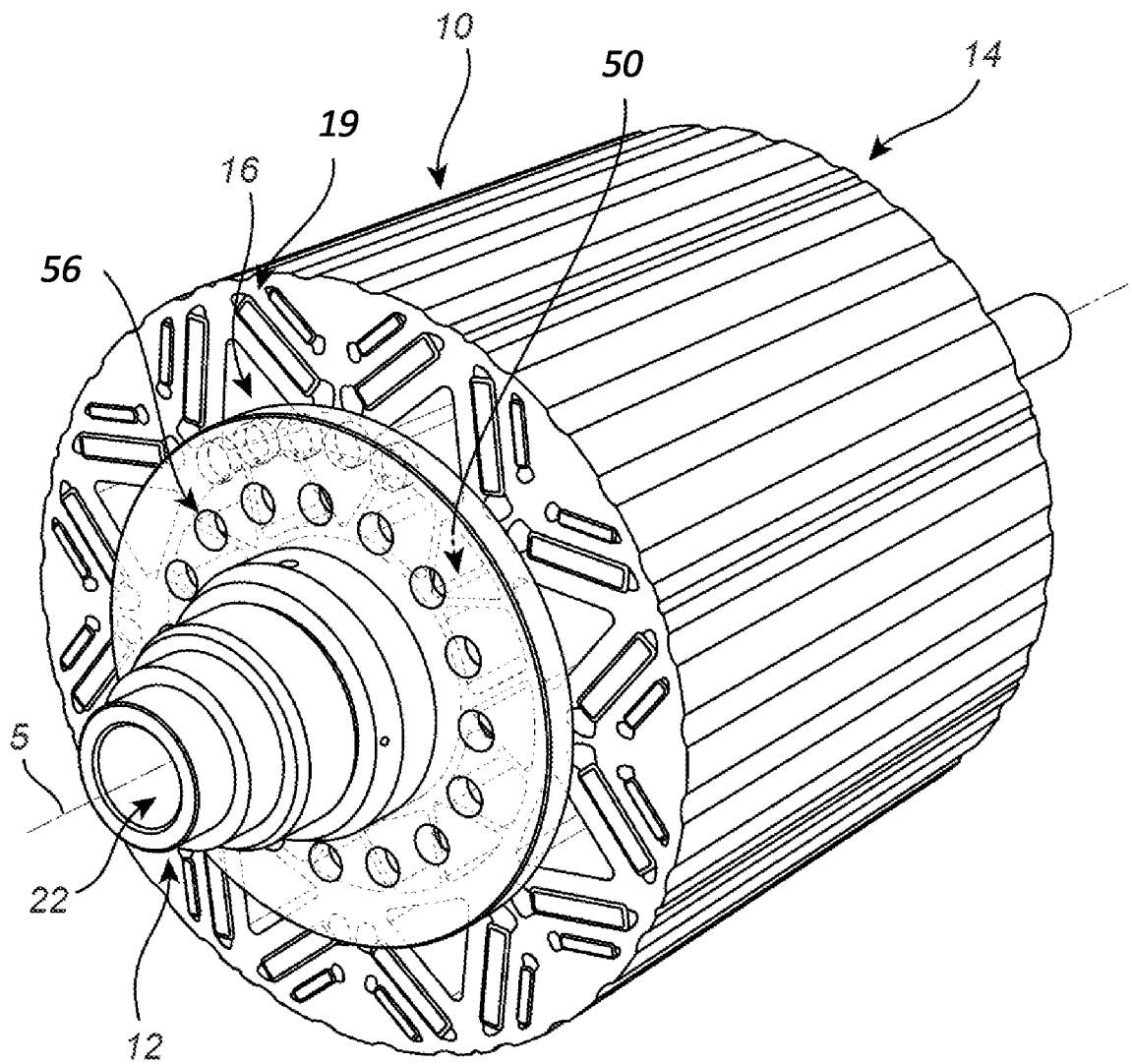
FIG. 9 is a perspective view of another illustrative embodiment of the rotor assembly of the present disclosure, highlighting the associated outlet end ring and rotor shaft and rotor core.

FIG. 9 is a perspective view of the rotor assembly 10 of the present disclosure, highlighting the first end, including the associated outlet end ring 16, rotor shaft 12, and rotor core 14, as described in detail herein above and below.

Figure 10:
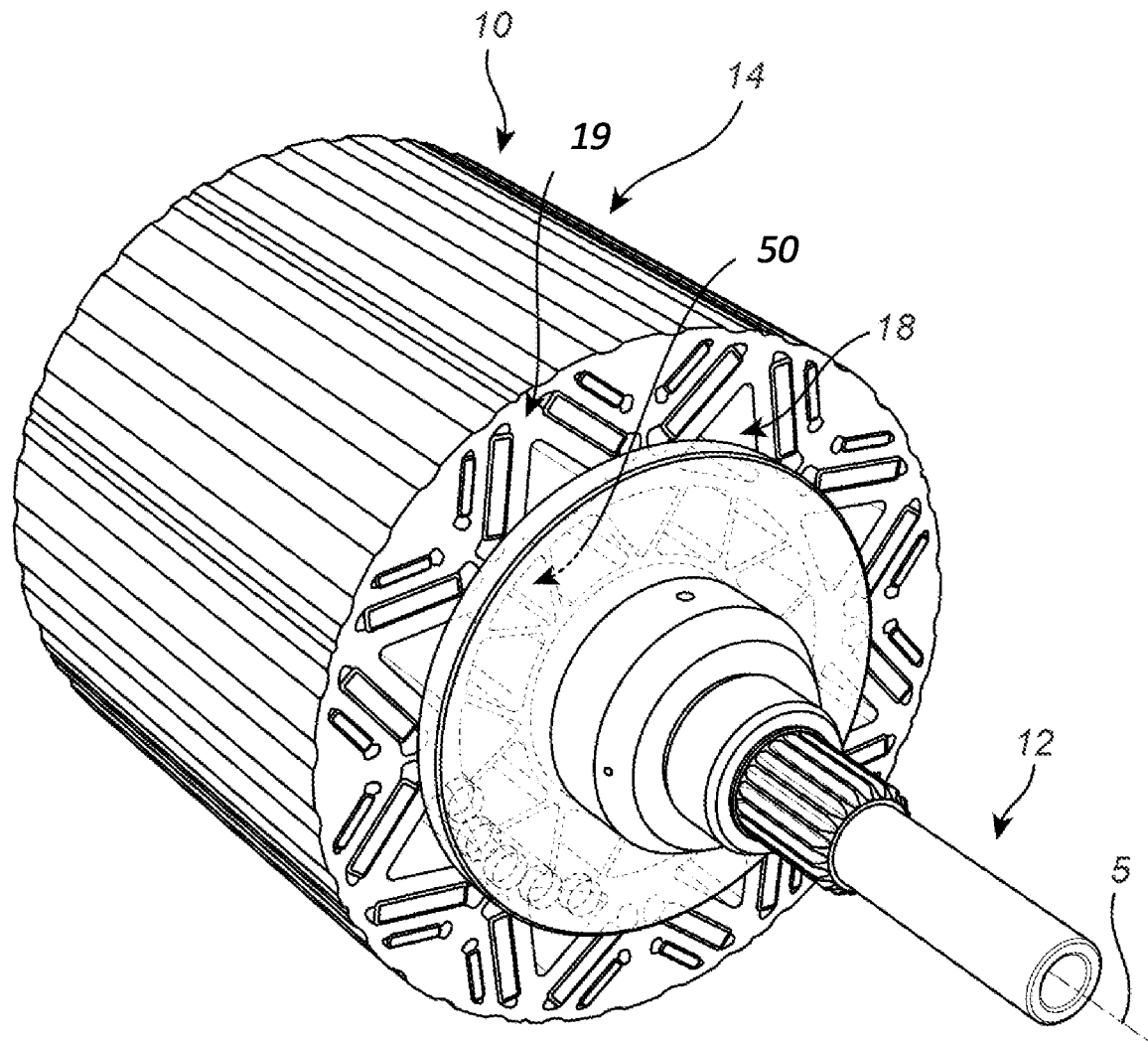
FIG. 10 is another perspective view of another illustrative embodiment of the rotor assembly of the present disclosure, highlighting the associated annulus end ring and rotor shaft and rotor core.

FIG. 10 is another perspective view of the rotor assembly 10 of the present disclosure, highlighting the second end, including the associated annulus end ring 18, rotor shaft 12, rotor core 14, as described in detail herein above and below.

Figure 11:
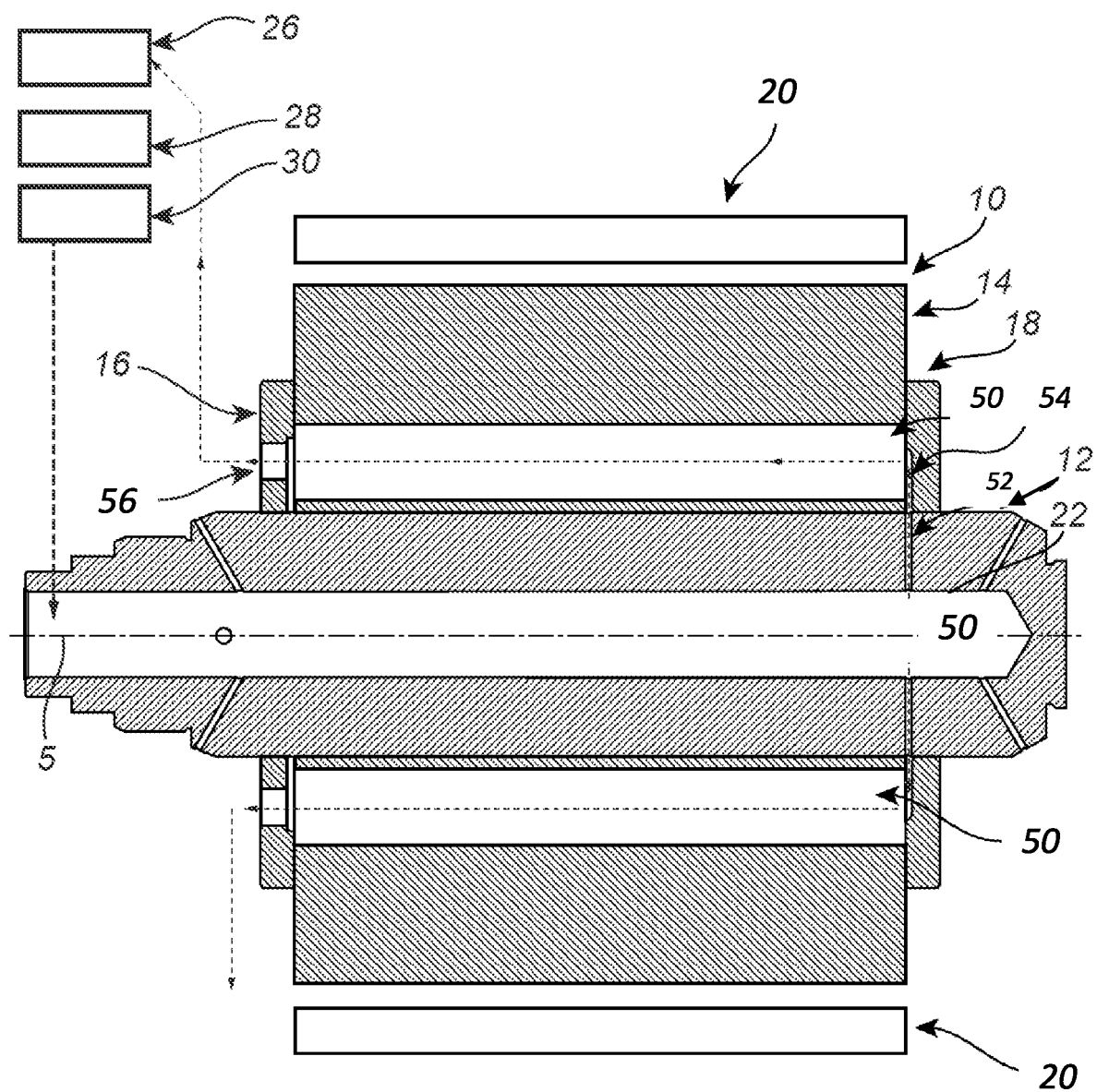
FIG. 11 is a cross-sectional side view of another illustrative embodiment of the rotor assembly of the present disclosure, highlighting the associated outlet end ring, annulus end ring, and interconnected cooling fluid cavity/channels of the associated rotor shaft and rotor core.

Referring now specifically to FIG. 11, the rotor assembly 10 of the present disclosure generally includes the cylindrical rotor shaft 12 concentrically surrounded by the cylindrical rotor core 14. The rotor shaft 12 and rotor core 14 are configured to rotate concentrically about a common rotor assembly axis 5 in unison, potentially at high RPM. The rotor shaft 12 and rotor core 14 are typically both manufactured from steel. The rotor core 14 is capped at a first end by an outlet end ring 16 and at a second end by an annulus end ring 16, both of which consist of annular structures that abut the rotor core 14 but surround the rotor shaft 12.

Again, the rotor core 14 includes a plurality of concentrically (and otherwise) arranged permanent magnets 19 (see FIGS. 1-4) that rotate with the rotor core 14, thereby interacting with the adjacent stator 20. These magnets 19 may have varying sizes. Copper end windings (not illustrated) or the like may also be provided.

The rotor shaft 12 defines the internal cavity 22 that runs at least the length of the rotor core 14 along the rotor assembly axis 5. The rotor core 14 also defines the internal channel 50 that runs the length of the rotor core 14, parallel to the internal cavity 22 of the rotor shaft 12, but disposed radially outwards of the internal cavity 22 of the rotor shaft 12 and the rotor assembly axis 5. Each of these internal cavity/channels 22, 50 is configured to transport a cooling fluid flow, such as an oil flow, through the corresponding component 12, 14. As illustrated, the internal cavity 22 of the rotor shaft 12 is a cylindrical cavity, while the internal channel 50 of the rotor core 14 is a prismatic channel, although any suitable cross-sectional shapes may be utilized, provided that each of the cavity/channels 22, 50 is elongated and substantially traverses the length of the rotor core 14. It should be noted that the internal channel 50 of the rotor core 14 may be any desired radial distance from the rotor assembly axis 5 and the internal cavity 22 of the rotor shaft 12, however the internal channel 50 of the rotor core 14 is generally disposed inside of and/or adjacent to the magnets 19 of the rotor core 14. It should again be noted that, although a singular rotor core internal channel 50 is typically described herein for simplicity, multiple concentrically arranged such rotor core internal channels 24 are preferably utilized and balanced around the periphery of the rotor core 14, all coupled to a single, central rotor shaft internal cavity 22.

In terms of flow direction, the cooling fluid is delivered from a heat exchanger 26, pump 28, and optional filter 30 external to the rotor assembly 10, to the internal cavity 22 of the rotor shaft 12 and internal channel 50 of the rotor core 14 in series. The cooling fluid flows into an inlet end of the internal cavity 22 of the rotor shaft 12 at the first end of the rotor assembly 10 including the outlet end ring 16 and flows along the rotor assembly axis 5 to an outlet end of the internal cavity 22 of the rotor shaft 12 at the second end of the rotor assembly 10 including the annulus end ring 18, and then flows into an inlet end of the internal channel 50 of the rotor core 14 at the second end of the rotor assembly 10 including the annulus end ring 18 and flows parallel to the rotor assembly axis 5 to an outlet end of the internal channel 50 of the rotor core 14 at the first end of the rotor assembly 10 including the outlet end ring 16, before being returned to the heat exchanger 26, pump 28, and filter 30. The cooling fluid is cool entering the rotor assembly 10 and hot leaving the rotor assembly 10, having absorbed unwanted heat from the rotor shaft 12 and rotor core 14. The pump 28, in part, provides motive force for forcing the cooling fluid through the rotor shaft 12 and rotor core 14.

The cooling fluid is transported by centrifugal force, as the rotor assembly 10 spins, from the outlet end of the internal cavity 22 of the rotor shaft 12 to the inlet end of the internal channel 50 of the rotor core 14 by a plurality of radially-oriented passages 52 formed through the wall of the rotor shaft 12, as well as an annulus cavity 54 disposed between the annulus end ring 18 and the second end of the rotor core 14, and specifically the laminate stack of the rotor core 14. This cavity 54 may be formed by a recess manufactured into one or both of the annulus end ring 18 and the second end of the rotor core 14. Thus, a cooling fluid flow path is provided through the internal cavity 22 of the rotor shaft 12, the passages 52, the annulus cavity 54, and the internal channels 24 of the rotor core 14, with the use of both the passages 52 and the cavity 54 being optional. For example, the passages 52 may directly couple the internal cavity 22 of the rotor shaft 12 to the internal channels 24 of the rotor core 14, or the internal cavity 22 of the rotor shaft 12 and the internal channels 24 of the rotor core 14 may both directly intersect the cavity 54. The passages 52 and the cavity 54 provide a centrifugal force flow path for the cooling fluid as the rotor assembly 10 is spun, in part providing further motive force for forcing the cooling fluid through the rotor shaft 12 and rotor core 14.

Again, the outlet end ring 16 includes a plurality of outlet ports 56 corresponding to the plurality of rotor core internal channels 24 that may or may not serve to partially constrict the cooling fluid flow out of the plurality of rotor core internal channels 24. In the event that such constriction is provided, the cooling fluid is encouraged to coat the surfaces of the plurality of rotor core internal channels 24 and the surface of the rotor shaft internal channel, thereby enhancing cooling capabilities. Once leaving the rotor core internal channels 24, the cooling fluid travels radially outwards to potentially cool the copper end windings or other structures mentioned above and ultimately be returned to the heat exchanger 26, pump 28, and filter 30, before the circuit is repeated after the collected heat has been expelled external to the rotor assembly 10.

Figure 12:
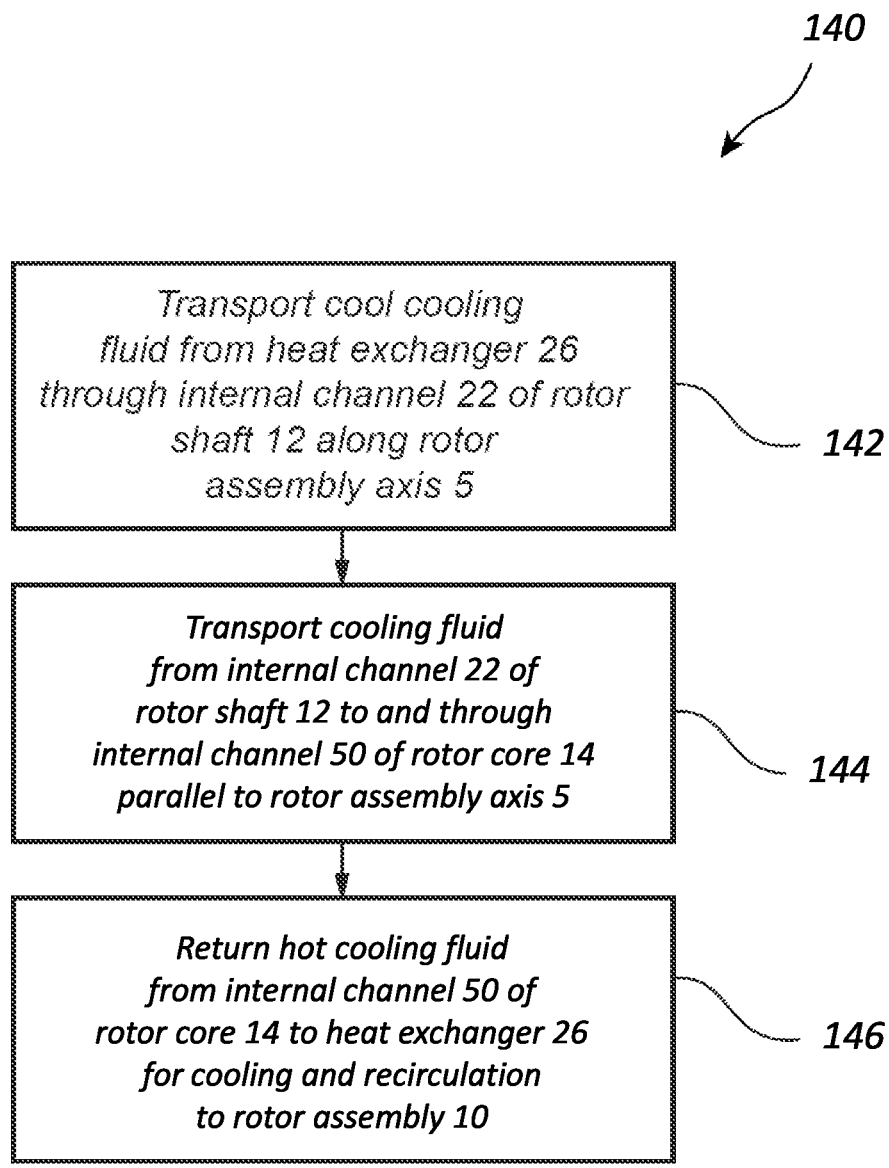
FIG. 12 is a flowchart of another illustrative embodiment of a method for cooling the rotor assembly of the present disclosure via the internal circulation of a cooling fluid through the associated rotor shaft and rotor core.

FIG. 12 illustrates the rotor cooling methodology 140 of the present disclosure, making direct reference to the components of the prior figures. The cooling fluid is delivered from the heat exchanger 26, pump 28, and optional filter 30 external to the rotor assembly 10, to the internal cavity 22 of the rotor shaft 12 and internal channel 50 of the rotor core 14 in series. The cooling fluid first flows into an inlet end of the internal cavity 22 of the rotor shaft 12 at the first end of the rotor assembly 10 including the outlet end ring 16 and flows along the rotor assembly axis 5 to an outlet end of the internal cavity 22 of the rotor shaft 12 at the second end of the rotor assembly 10 including the annulus end ring 18 (step 142), and then flows into an inlet end of the internal channel 50 of the rotor core 14 at the second end of the rotor assembly 10 including the annulus end ring 18 and flows parallel to the rotor assembly axis 5 to an outlet end of the internal channel 50 of the rotor core 14 at the first end of the rotor assembly 10 including the outlet end ring 16 (step 144), before being returned to the heat exchanger 26, pump 28, and filter 30 (step 146). The cooling fluid is cool entering the rotor assembly 10 and hot leaving the rotor assembly 10, having absorbed unwanted heat from the rotor shaft 12 and rotor core 14. The pump 28, in part, provides motive force for forcing the cooling fluid through the rotor shaft 12 and rotor core 14. The cooling fluid is transported by centrifugal force, as the rotor assembly 10 spins, from the outlet end of the internal cavity 22 of the rotor shaft 12 to the inlet end of the internal channel 50 of the rotor core 14 by a plurality of radially-oriented passages 52 formed through the wall of the rotor shaft 12, as well as a cavity 54 disposed between the annulus end ring 18 and the second end of the rotor core 14, and specifically the laminate stack of the rotor core 14. This cavity 54 may be formed by a recess manufactured into one or both of the annulus end ring 18 and the second end of the rotor core 14. Thus, a cooling fluid flow path is provided through the internal cavity 22 of the rotor shaft 12, the passages 52, the cavity 54, and the internal channels 24 of the rotor core 14, with the use of both the passages 52 and the cavity 54 being optional. For example, the passages 52 may directly couple the internal cavity 22 of the rotor shaft 12 to the internal channels 24 of the rotor core 14, or the internal cavity 22 of the rotor shaft 12 and the internal channels 24 of the rotor core 14 may both directly intersect the cavity 54. The passages 52 and the cavity 54 provide a centrifugal force flow path for the cooling fluid as the rotor assembly 10 is spun, in part providing further motive force for forcing the cooling fluid through the rotor shaft 12 and rotor core 14.

Again, heat extraction from the rotor magnets and lamination core directly impacts machine performance, increasing continuous power and torque output. Such heat extraction allows the motor to spin faster, enabling a wide RPM operating range. The reliability of the EM is increased significantly. Keeping the rotor assembly cooler results in higher power output and longer duration at peak torque, without the system degrading due to thermal limitations. This is advantageous in both automotive and other applications.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A rotor/stator assembly for a motor, comprising:
a rotor shaft comprising a first internal channel;
a rotor core surrounding the rotor shaft;
end windings disposed adjacent to an end of the rotor shaft and an end of the rotor core;
a first end ring abutting a first end of the rotor core and surrounding the rotor shaft; and
a second end ring including an annular structure abutting a second end of the rotor core and surrounding the rotor shaft;
wherein the rotor shaft further comprises a first passage perpendicular to a rotor axis of the rotor shaft and passing through a wall of the rotor shaft at the end thereof, thereby forming a first path by which a cooling fluid is configured to pass from the first internal channel of the rotor shaft to the rotor core and to the end windings in response to a rotation of the rotor shaft; and
wherein the rotor shaft further comprises a second passage aligned non-perpendicular to the rotor axis and defines a second path passing through the wall of the rotor shaft axially beyond the first end ring or axially beyond the second end ring such that the end of the first internal channel is in fluid communication with the end windings in response to the rotation of the rotor shaft.

2. The rotor/stator assembly of claim 1, wherein the end windings comprise:
a plurality of crown end windings disposed adjacent to the first end of the rotor core; and
a plurality of weld end windings disposed adjacent to the second end of the rotor core opposite from the first end.

3. The rotor/stator assembly of claim 1, wherein the second passage is circumferentially offset from the first passage about the rotor shaft at the end thereof.

4. The rotor/stator assembly of claim 1, wherein the first passage and the second passage define radially-arranged passages passing through the wall of the rotor shaft.

5. The rotor/stator assembly of claim 1, wherein:
the first passage comprises a relatively smaller cross-sectional diameter, and
the second passage comprises a relatively larger cross-sectional diameter, thereby balancing flow of the cooling fluid through the first passage and the second passage in response to the cooling fluid being pumped into the first internal channel of the rotor shaft.

6. The rotor/stator assembly of claim 1, wherein:
the rotor core comprises a second internal channel,
the first end ring comprising an outlet port,
the cooling fluid is configured to pass, via the second internal channel and the outlet port, from the first internal channel of the rotor shaft to the rotor core and to the end windings.

7. A motor assembly for a vehicle, comprising:
a rotor/stator assembly, comprising:
a rotor shaft comprising:
an internal channel,
a wall,
a first passage extending from the internal channel and passing through the wall, and
a second passage extending from the internal channel passing through the wall, the second passage circumferentially offset with respect to the first passage;
a rotor core disposed adjacent to the rotor shaft;
end windings disposed adjacent to an end of the rotor shaft and an end of the rotor core;
a first end ring abutting a first end of the rotor core and surrounding the rotor shaft; and
a second end ring abutting a second end of the rotor core and surrounding the rotor shaft;
wherein the first passage forms a first path by which a cooling fluid is configured to pass from the internal channel of the rotor shaft to the end of the rotor core and the end windings in response to rotation of the rotor shaft is rotated; and
wherein the second passage is aligned non-perpendicular to a rotor axis and defines a passage outlet in a radially exterior surface of the wall of the rotor shaft axially beyond the first end ring or axially beyond the second end ring such that the end of the internal channel of the rotor shaft is in fluid communication with the end windings in response to the rotation of the rotor shaft is rotated, as well as in fluid communication with a bearing disposed adjacent to the rotor core.

8. The motor assembly of claim 7, wherein the end windings comprise:
a plurality of crown end windings disposed adjacent to the first end of the rotor core; and
a plurality of weld end windings disposed adjacent to the second end of the rotor core opposite from the first end.

9. The motor assembly of claim 8, wherein the first passage is angled in a direction opposite a direction of the second passage.

10. The motor assembly of claim 7, wherein the rotor shaft further comprises an additional passage that is aligned perpendicular to the rotor axis such that the cooling fluid passes from the internal channel of the rotor shaft to the end windings when the rotor shaft is rotated, wherein the second passage is circumferentially offset from the first passage by 90 degrees about the rotor shaft at the end thereof.

11. The motor assembly of claim 7, wherein the first passage and the second passage define radially-arranged passages passing through the wall of the rotor shaft.

12. The motor assembly of claim 7, wherein:
the first passage comprises a relatively smaller cross-sectional diameter, and the second passage comprises a relatively larger cross-sectional diameter, thereby balancing flow of the cooling fluid through the first passage and the second passage in response to the cooling fluid being pumped into the internal channel of the rotor shaft.

13. The motor assembly of claim 7, further comprising a heat exchanger, a pump, a filter, and a cooling fluid inlet tube coupled to the rotor shaft and the internal channel thereof.

14. The motor assembly of claim 13, further comprising a cooling fluid sump coupled to the end windings, the cooling fluid sump adapted to collect the cooling fluid from the rotor shaft and the rotor core and recirculate the cooling fluid to the heat exchanger.

15. A method for cooling a rotor/stator assembly for a motor, comprising:
    providing a rotor shaft comprising an internal channel and a non-perpendicular passage;
    providing a rotor core disposed adjacent to the rotor shaft;
    providing end windings disposed adjacent to an end of the rotor shaft and an end of the rotor core;
    providing a first end ring abutting a first end of the rotor core and surrounding the rotor shaft;
    providing a second end ring including an annular structure abutting a second end of the rotor core and surrounding the rotor shaft; and
    rotating the rotor shaft and the rotor core and pumping, based on rotating the rotor shaft, a cooling fluid into the internal channel of the rotor shaft;
    wherein the non-perpendicular passage passes through a wall of the rotor shaft at the end thereof, thereby forming a path aligned with the end windings and a bearing and by which the cooling fluid is configured to pass from the internal channel of the rotor shaft to the end of the rotor core and the end windings and to the bearing in response to a rotation of the rotor shaft.

16. The method of claim 15, wherein the end windings comprise:
    a plurality of crown end windings disposed adjacent to the first end of the rotor core; and
    a plurality of weld end windings disposed adjacent to the second end of the rotor core opposite from the first end.

17. The method of claim 15, further comprising a perpendicular passage, wherein the non-perpendicular passage is circumferentially offset from the perpendicular passage about the rotor shaft at the end thereof.

18. The method of claim 17, wherein the perpendicular passage and the non-perpendicular passage define radially-arranged passages passing through the wall of the rotor shaft.

19. The method of claim 17, wherein the perpendicular passage is angled in a direction opposite a direction of the non-perpendicular passage.

20. The method of claim 15, wherein:
    the perpendicular passage comprises a relatively smaller cross-sectional diameter, and
    the non-perpendicular passage comprises a relatively larger cross-sectional diameter, thereby balancing the cooling fluid flowing through the perpendicular passage and the non-perpendicular passage in response to the cooling fluid being pumped into the internal channel of the rotor shaft.

* * * * *